United States Patent [19]
Yamauchi

[11] Patent Number: 5,113,964
[45] Date of Patent: May 19, 1992

[54] FRONT AND REAR WHEEL DRIVE MOTORCYCLE

[75] Inventor: Kosaku Yamauchi, Shizuoka, Japan

[73] Assignee: Suzuki Jidosha Kogyo Kabushiki Kaisha, Japan

[21] Appl. No.: 545,912

[22] Filed: Jun. 28, 1990

[30] Foreign Application Priority Data

| Jun. 28, 1989 | [JP] | Japan | 1-163836 |
| Jun. 28, 1989 | [JP] | Japan | 1-163837 |
| Jun. 28, 1989 | [JP] | Japan | 1-163838 |
| Jun. 28, 1989 | [JP] | Japan | 1-163839 |
| Jun. 28, 1989 | [JP] | Japan | 1-163840 |
| Jun. 28, 1989 | [JP] | Japan | 1-163841 |
| Jun. 28, 1989 | [JP] | Japan | 1-163842 |

[51] Int. Cl.⁵ ............................................. B62M 7/02
[52] U.S. Cl. ......................... 180/224; 180/230; 180/231; 474/84
[58] Field of Search ............... 180/219, 223, 224, 229, 180/230, 231; 474/84, 85, 86, 87, 88, 93

[56] References Cited

U.S. PATENT DOCUMENTS

| 3,045,772 | 7/1962 | Nicolai | 180/224 |
| 3,199,623 | 8/1965 | Mangum | 180/224 |
| 4,484,901 | 11/1984 | Toti et al. | 474/88 |
| 4,509,933 | 4/1985 | Miranti et al. | 474/93 |
| 4,671,781 | 6/1987 | Tanaka et al. | 180/229 |
| 4,702,340 | 10/1987 | Hamilton | 180/224 |
| 4,712,629 | 12/1987 | Takahashi et al. | 180/219 |

FOREIGN PATENT DOCUMENTS

88/09739 12/1988 World Int. Prop. O. .......... 180/223

Primary Examiner—Charles A. Marmor
Assistant Examiner—A. M. Boehler
Attorney, Agent, or Firm—Bruce L. Adams; Van C. Wilks

[57] ABSTRACT

A front and rear wheel drive motorcycle includes an engine unit including a cylinder assembly and a crank shaft and first and second speed change belt mechanisms mounted to one end of the crank shaft for driving the front and rear wheels, respectively. The first and second speed change belt mechanisms are operatively connected to first and second speed change gear mechanisms through first and second speed change gear mechanisms through first and second driven pulleys respectively provided to the first and second change belt mechanism. To one end of the crank shaft is mounted a driving pulley means operated in common with the first and second speed change belt mechanisms. The driving pulley means comprises a stationary driving pulley mounted to one end of the crank shaft and operated in common with the first and second speed change belt mechanisms and a pair of movable driving pulleys mounted to one end of the crank shaft with the stationary driving pulley interposed therebetween. The cylinder assembly of the engine is directed substantially horizontally forward towards the front wheel or rearward towards the rear wheel with respect to the motorcycle body for effectively utilizing the space for the location of the respective elements or units of the motorcycle.

15 Claims, 8 Drawing Sheets

FRONT AND REAR WHEEL DRIVE MOTORCYCLE

BACKGROUND OF THE INVENTION

The present invention relates to a front and rear wheel drive motorcycle adapted to be driven on a sandy ground or a road having a soft road surface condition and more particularly to front and rear wheel drive motorcycle provided with non-stage speed change belt mechanism.

Generally, a motorcycle is provided with an engine to which a multi-stage gear transmission mechanism is connected through a manual clutch and the engine is operatively connected to a rear wheel through a chain to drive the rear wheel. Namely, the motorcycle of this type is run by driving the rear wheel and is steered by the front wheel. The speed change gears of the multi-stage gear transmission mechanism are selectively switched in accordance with a running speed of the motorcycle. The output of a power transmission shaft is branched through a differential clutch to drive the front wheel as disclosed in the Japanese Patent Laid-open Publication No. 58-206477, for example. The Japanese Laid-open Publication No. 61-181789, for example, discloses a three-wheeled vehicle in which the differential mechanism is eliminated between the front and rear wheels to drive only the front wheel.

For the motorcycle in which only the rear wheel is driven by the engine, it may become impossible to be smoothly driven when the rear wheel loses traction and slips, particularly when riding on sandy ground or soft road. On the other hand, for a motorcycle in which front and rear wheels are driven, it is necessary for a differential clutch or a differential mechanism to compensate for a rotation difference between the front and rear wheels due to the steering operation of the front wheel. In addition, for the differential mechanism, it is necessary to provide a slip preventing mechanism capable of driving the motorcycle by transmitting the driving force to one wheel when the other slips wheel. This complicates the structure of the mechanisms and, hence, the motorcycle itself, resulting in an increase of the manufacturing cost. Moreover, when riding on sandy ground or soft road, the wheels of the motorcycle receive large friction resistance from the road. Accordingly, the running speed of the motorcycle is extremely reduced during the changing operation of a speed change gear mechanism in the multi-stage gear transmission mechanism, thus being inconvenient for the smooth driving of the motorcycle.

SUMMARY OF THE INVENTION

An object of the present invention is to substantially eliminate the drawbacks of the prior art described above, and to provide a front and rear wheel drive motorcycle capable of smoothly running on a sandy road or a soft road. For example, by rising a non-stage speed change operation without requiring a differential mechanism thus allowing for a compact engine unit and driving mechanism of the motorcycle.

Another object of the present invention is to provide a front and rear wheel drive motorcycle capable of effectively cooling non-stage speed change belt mechanisms connected to the engine crank shaft.

These and other objects can be achieved according to the present invention by providing a front and rear wheel drive motorcycle in which the front and rear wheels are driven by an operation of an engine, comprising an engine unit including a cylinder assembly and a crank shaft, first and second speed change belt mechanisms mounted to one end of the crank shaft for driving the front and rear wheels, respectively. The first and second speed change mechanisms being operatively connected to first and second speed change gear mechanisms through first and second driven pulleys, respectively, provided to the first and second speed change belt mechanisms. A driving pulley means is mounted to one end of the crank shaft and operated is common with the first and second speed change belt mechanisms.

In preferred embodiments, the driving pulley means comprises a stationary driving pulley mounted to one end of the crank shaft and operated is common with the first and second speed change belt mechanisms and a pair of movable driving pulleys are mounted to one end of the crank shaft with the stationary driving pulley interposed therebetween.

The stationary pulley is provided with an inner hollow portion in which a plurality of fans are located, the inner hollow portion being communication with an axial bore of the crank shaft.

The cylinder assembly is directed forwardly with respect to the front wheel and the first driven pulley of the first speed change belt mechanism and the first speed change gear mechanism on the side of the front wheel are disposed at an upper side of the cylinder assembly of the engine unit.

The cylinder assembly is directed forwardly with respect to the front wheel and the first driven pulley of the first speed change belt mechanism on the side of the front wheel. The first speed change gear mechanism on the side of the front wheel has an output shaft disposed substantially horizontally in front of the first driven pulley.

The first and second speed change belt mechanisms are operatively connected to first and second speed change gear mechanisms further through first and second centrifugal clutch means.

The crank shaft has another end to which a cooling fan is magnetically mounted by a magnetic attraction force between a magnet, to which the cooling fan is secured, and the crank shaft.

In another aspect of the present invention, there is provided a front and rear wheel drive motorcycle in which front and rear wheels are driven by an operation of an engine. An engine unit includes a cylinder assembly and a crank shaft with, the cylinder assembly being directed rearwardly with respect to the rear wheel. First and second speed change belt mechanisms are mounted to one end of the crank shaft for driving the front and rear wheels, respectively. The first speed change belt mechanism is operatively connected to a first speed change gear mechanism disposed at a front upper portion of the engine unit. The second speed change belt mechanism is disposed on a side of the cylinder assembly and operatively connected to the second speed change gear mechanism disposed on a rear side of the cylinder assembly, and a driving pulley means is mounted on one end of the crank shaft and operated is common with the first and second speed change belt mechanisms.

According to the character of the front and rear wheel drive motorcycle described above, the driving pulleys of two non-stage speed change belt mechanisms are mounted side by side on one end portion of the crank shaft. The rotation difference between the front and rear wheels can be compensated by the non-stage speed change belt mechanisms, so that there is no need for the provision of the differential clutch means, for example, thus making the mechanism compact while being manufactured reduced cost. In addition, since the non-stage speed change belt mechanisms are automatically speed-changed, the motorcycle can run smoothly on a sandy road or a soft road, for example. Even if one wheel slips, the driving force is transmitted to the other wheel to thereby smoothly drive the motorcycle.

Since the cylinder assembly of the engine unit is disposed horizontally forwardly, the driven pulleys and speed change mechanisms can be arranged on the upper side of the cylinder assembly, thus making the structure compact and reducing the height of the motorcycle body. In addition, the cylinder assembly of the engine unit is also disposed horizontally rearwardly to be positioned in a space in front of the rear side speed change gear mechanism, thus also making the structure compact and reducing the height of the motorcycle body. The driven pulley on the front wheel side of the non-staged speed change belt mechanism is located at an upper portion in front of the crank shaft of the engine and the output shaft of the speed change gear mechanism is disposed on substantially the horizontal front side thereof, so that the speed change gear mechanism can be accommodated in a lower portion of the front portion of the motorcycle body.

One stationary pulley mounted to one end of the crank shaft is commonly utilized for two non-stage speed change belt mechanisms, so that the total length of the crank shaft can be reduced, thus making the structure of the engine compact. The location of the fans in the inner hollow portion of the stationary pulley can effectively cool the belt, thus improving the durability thereof.

DESCRIPTION OF THE PREFERRED EMBODIMENTS

Figure 1:
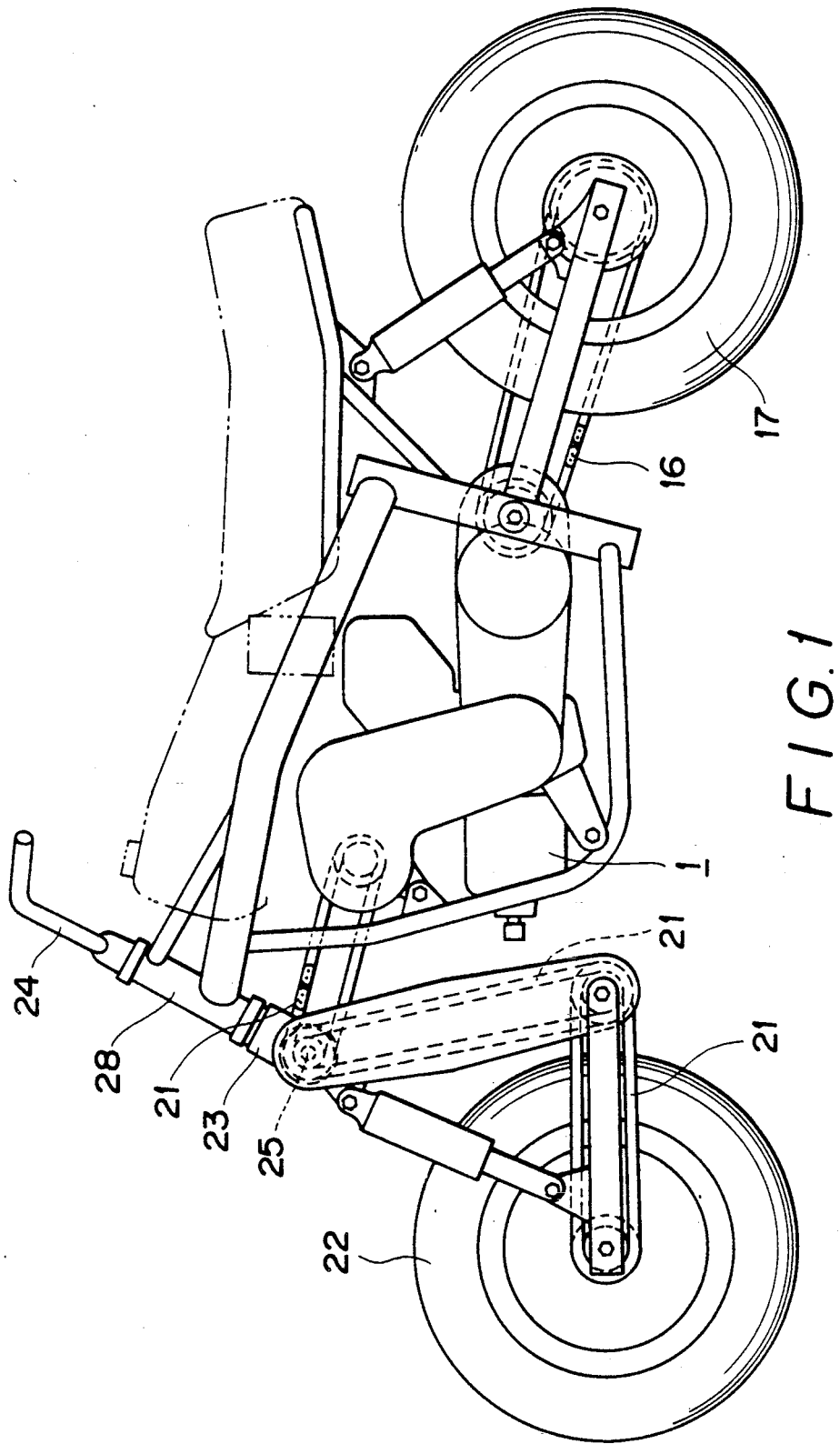
FIG. 1 is a side view of a front and rear wheel drive motorcycle equipped with a speed change system according to the present invention.
Figure 2:
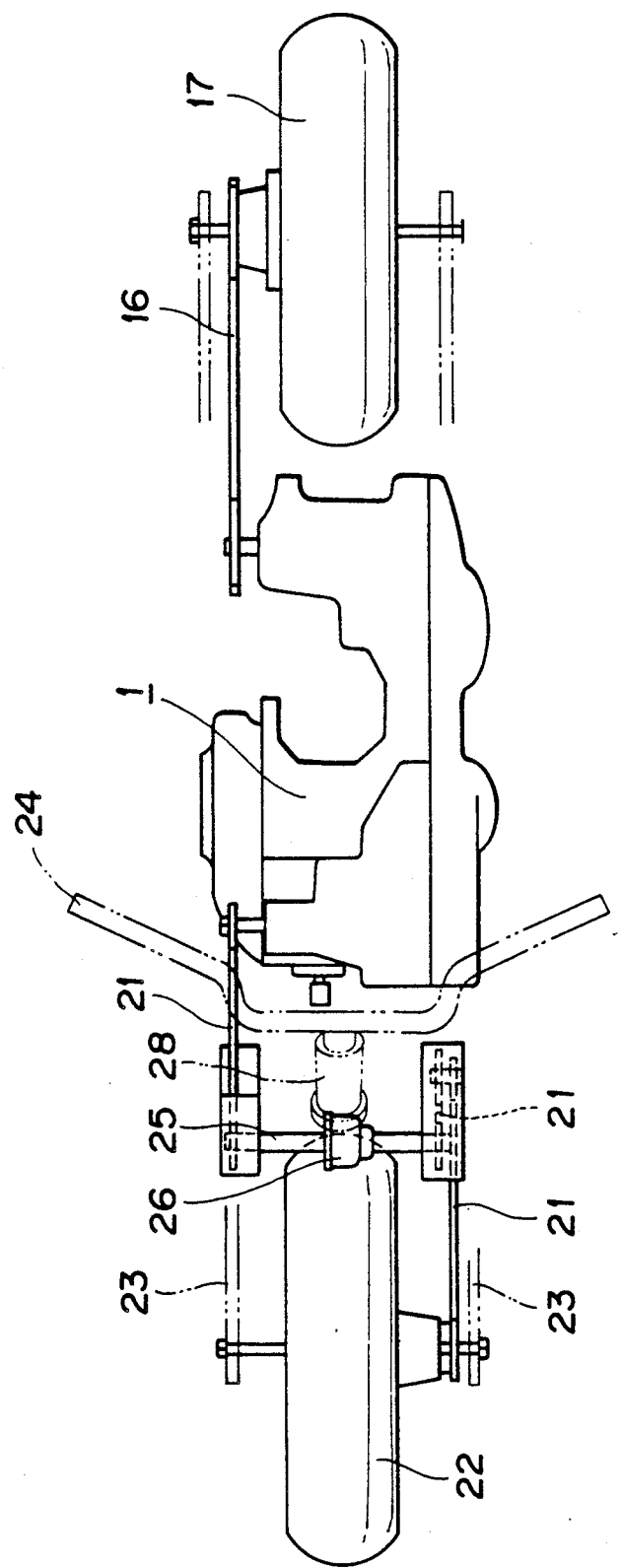
FIG. 2 is brief top plan view of the motorcycle shown in FIG. 1.

FIG. 1 is a brief side view of a motorcycle of a front and rear wheel drive type according to the present invention, in which the motorcycle is equipped with a front wheel 22 and a rear wheel 17 which are driven by the operation of an engine 1 through chains 21 and 16, respectively. The front wheel 22 is steered by a handle member 24 through a front fork 23. FIG. 2 is a brief illustration of a plan view of the motorcycle shown in FIG. 1.

Figure 3:
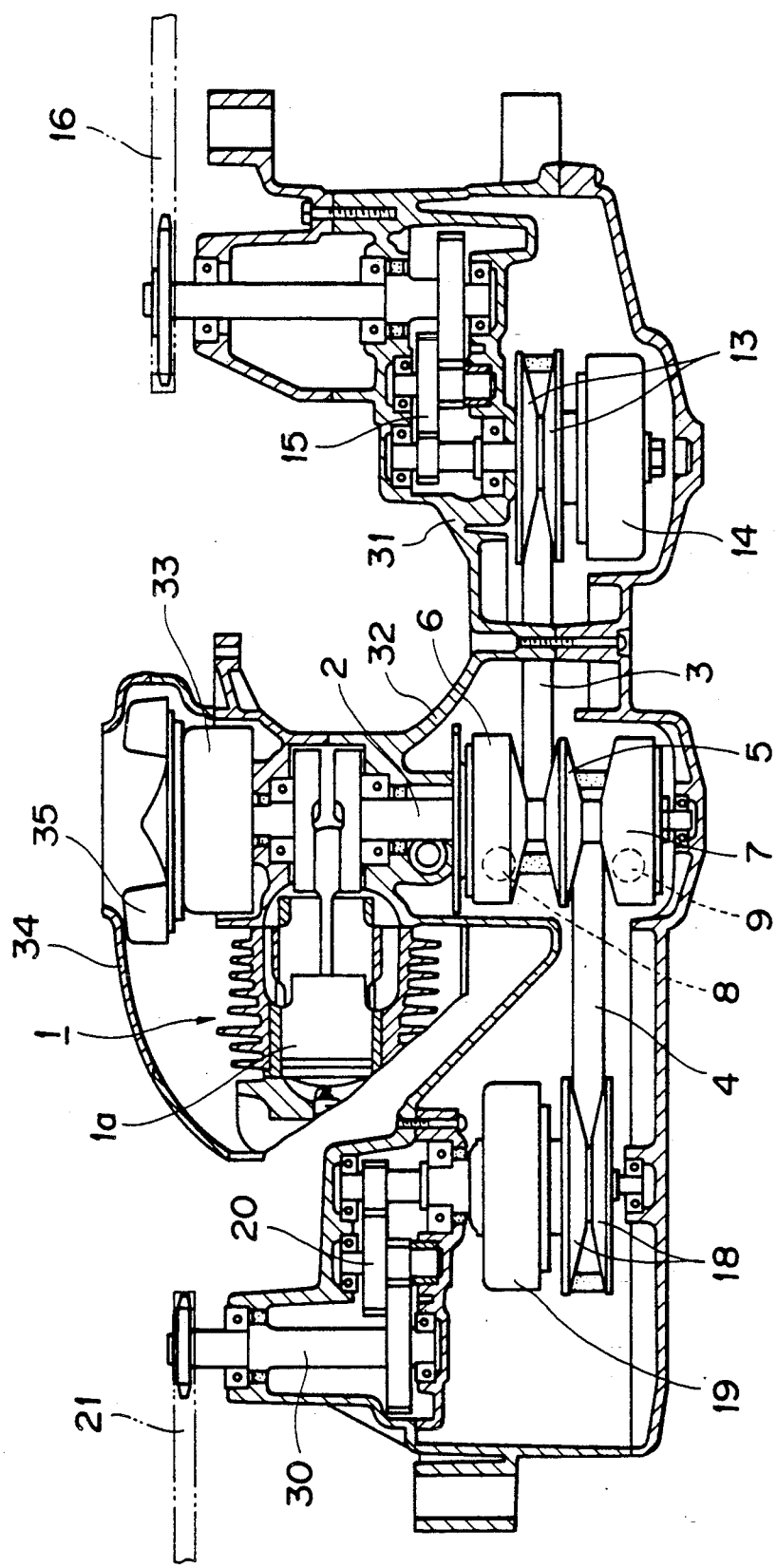
FIG. 3 is a sectional view of one embodiment of a speed change system of the motorcycle shown in FIG. 1.
Figure 5:
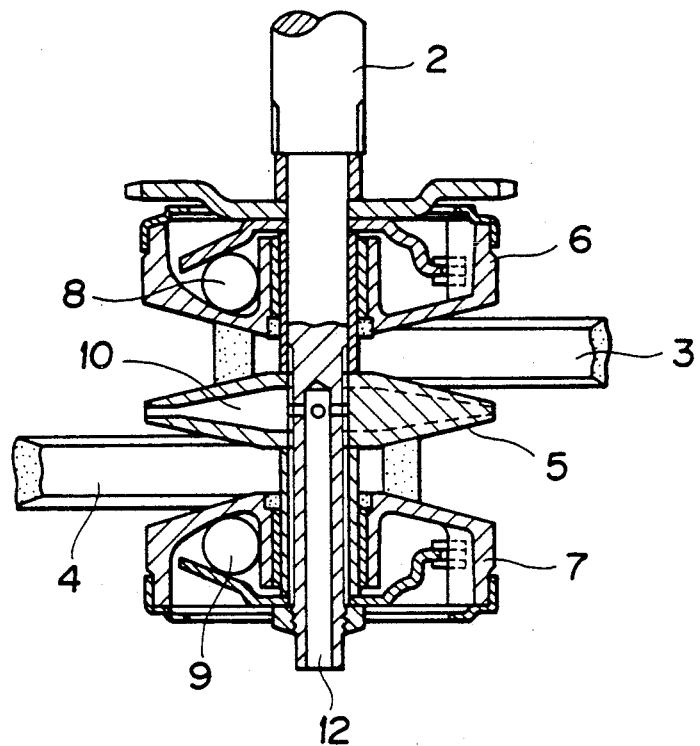
FIG. 5 is an enlarged sectional view of one end of the crank shaft shown in FIG. 3.

FIG. 3 is a sectional view of a main body of the motorcycle shown in FIG. 1. Referring to FIG. 3, in which an engine 1 is provided with a cylinder assembly 1a directed substantially horizontally forwardly, two non-stage speed change belt mechanisms 3 and 4 are connected to one end of a crank shaft 2 of the engine 1. A stationary driving pulley 5 having conical surfaces on both sides thereof is mounted on the crank shaft 2 and two movable driving pulleys 6 and 7 are arranged on both conical surface sides of the stationary driving pulley 5 in contact therewith. As shown in FIG. 5, centrifugal weights 8 and 9 are incorporated in the movable driving pulleys 6 and 7, respectively to be outwardly displaceable along the inclined surfaces, so as to slide the movable driving pulleys 6 and 7 to approach the stationary driving pulley 5 when the rotation of the engine, i.e. the crank shaft 2, is increased, thus increasing the rotational speed applied to a belt stretched around the pulley 5 and, hence, increasing the running speed of the motorcycle.

Figure 6:
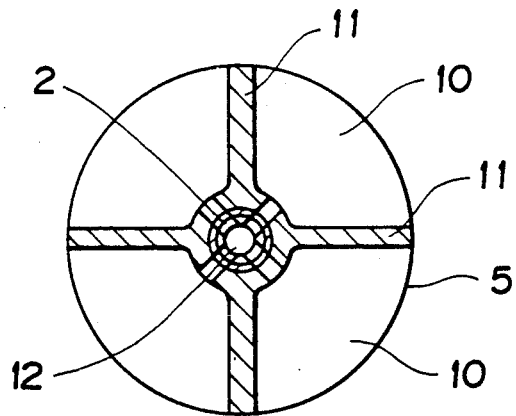
FIG. 6 is a brief sectional view of a stationary pulley mounted to the crank shaft shown in FIG. 5.

In a preferred embodiment of the present invention, the stationary driving pulley 5 may be provided with an inner hollow portion 10 in which a plurality of fans 11 are radially accommodated and the inner side of the hollow portion 10 is communicated with an axial hole 12 (FIG. 6) formed in the crank shaft 2 so as to forcibly cool the engine. The movable pulleys 6 and 7 and the stationary pulley 5 constitute, in a pair, a drive side pulley means. Reference numeral 33 in FIG. 3 designates a magnet which is mounted on the outer end of the crank shaft 2 and to which the fans 35 are secured. The fans 35 and the cylinder assembly 1a of the engine 1 is covered by a fan cover 34.

Figure 4:
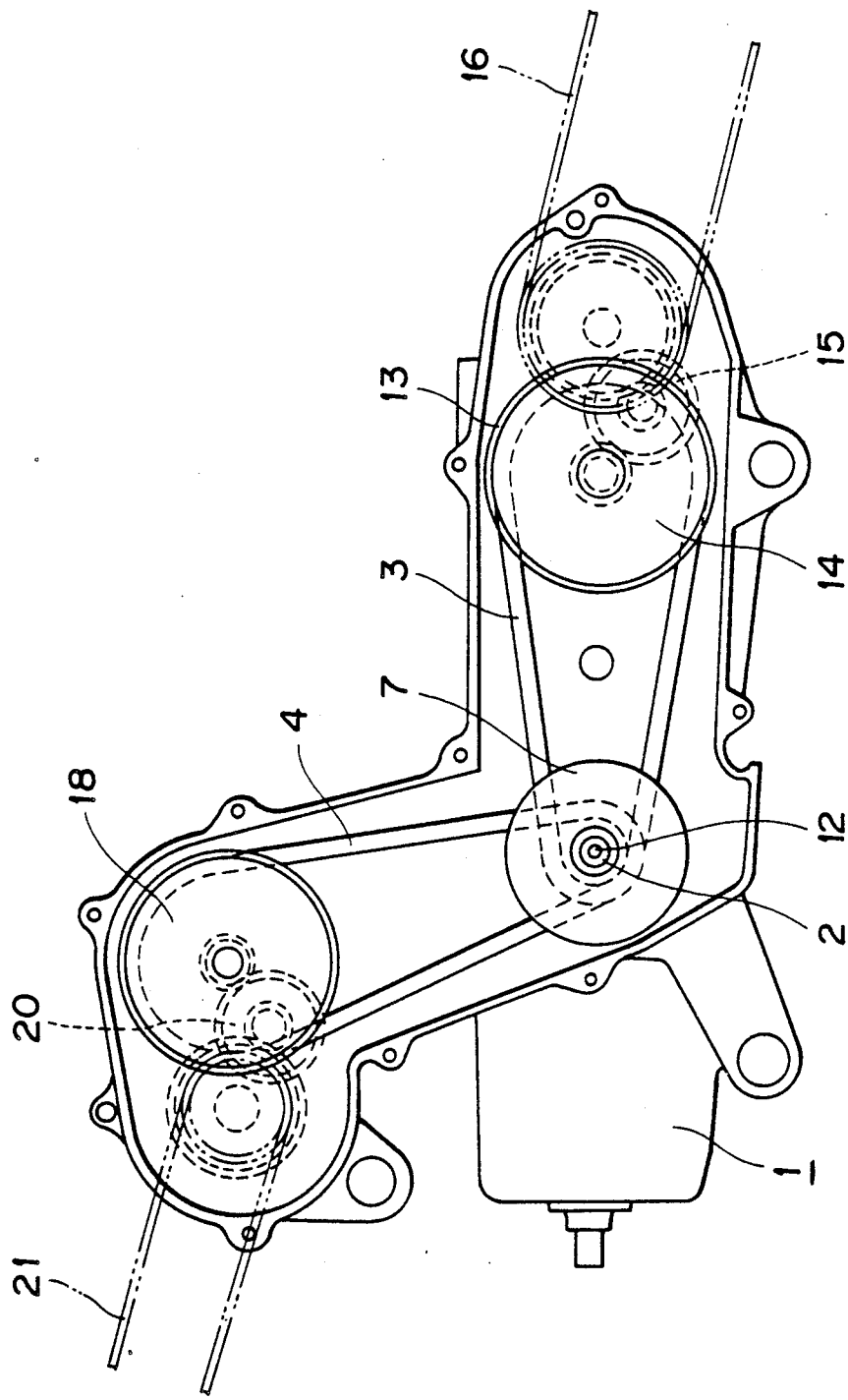
FIG. 4 is a side view of the speed change mechanism shown in FIG. 3 with a side case removed.

As shown in FIG. 4, a driven pulley 13 of the non-stage speed change belt mechanism 3 is disposed behind the crank shaft 2 and connected to a speed change gear mechanism 15 through a centrifugal clutch 14, which in turn is connected to the rear wheel 17 through the chain 16. A driven pulley 18 of the non-stage speed change belt mechanism 4 is disposed on a front upper side of the crank shaft 2 and connected to a speed change gear mechanism 20 through a centrifugal clutch 19, which in turn is connective to the front wheel 22 through the chain 21. Accordingly, the driven pulley 18 and the speed change gear mechanism 20 can be arranged to the upper portion of the cylinder assembly 1a of the engine, whereby the heights of the engine 1 and the driving portion, i.e. the whole height of the motorcycle body, can be made small and light. An output shaft 30 of the speed change gear mechanism 20 is disposed on the front side of the driven pulley 18 in substantially the horizontal direction. To the output shaft 30 is connected the chain 21 which is operatively connected to the front wheel 22.

The driving unit including two non-stage speed change belt mechanisms 3 and 4 is arranged in a unit case 31 integrally formed with the case of the engine 1. The unit case 31 is mounted at the front lower portion of the motorcycle body to the front end of which a head pipe 28 (FIG. 1) is arranged. The engine 1 is arranged in the unit case 31 including an engine case half 32 so that the cylinder assembly 1a is directed horizontally forward toward the front wheel. The driven pulley 18 for driving the front wheel 22 is disposed on the front side, but the front portion of the motorcycle body is made high, so that the driven pulley 18 of the non-stage speed change belt mechanism can be effectively accommodated in the engine case half 32. The output shaft 30 is disposed on the front side thereof near the front fork 23 to thereby make short the length of the chain 21, thus making compact the unit case 31 and reducing vibration of the unit case and, hence, the motorcycle body. The front wheel 22 is secured to the front fork 23 which is bilaterally steered by the operation of the handle 24. A uniform speed ball joint 26 is mounted to an intermediate shaft 25 (FIG. 2) for the chain 21. The front portion of the cylinder assembly 1a may be inclined to the extent such that the front portion thereof does not abut against a case portion in which the driven pulley 18 is accommodated.

When the engine 1 is idly driven, two non-stage speed change belt mechanisms 3 and 4 are rotated. Next, when the rotation speed of the engine 1 is slightly increased, the centrifugal clutches 14 and 19 are operatively connected to thereby drive the front and rear wheels 22 and 17, thus starting the running of the motorcycle. When the rotation speed of the engine 1 is further increased, the non-stage speed change belt mechanisms 3 and 4 are increased in speed to thereby increase the running speed of the motorcycle.

According to the structure of the motorcycle described above, the two non-stage speed change belt mechanisms 3 and 4 are operatively associated with one stationary driving pulley 5, so that the crank shaft 2 is made short in length and since the stationary driving pulley 5 can be cooled by the rotation of the crank shaft 2, the temperature increase thereof due to the friction between the pulley 5 and the non-stage speed change belt mechanisms 3 and 4 can be effectively prevented, thus improving the durability of the belt.

Figure 7:
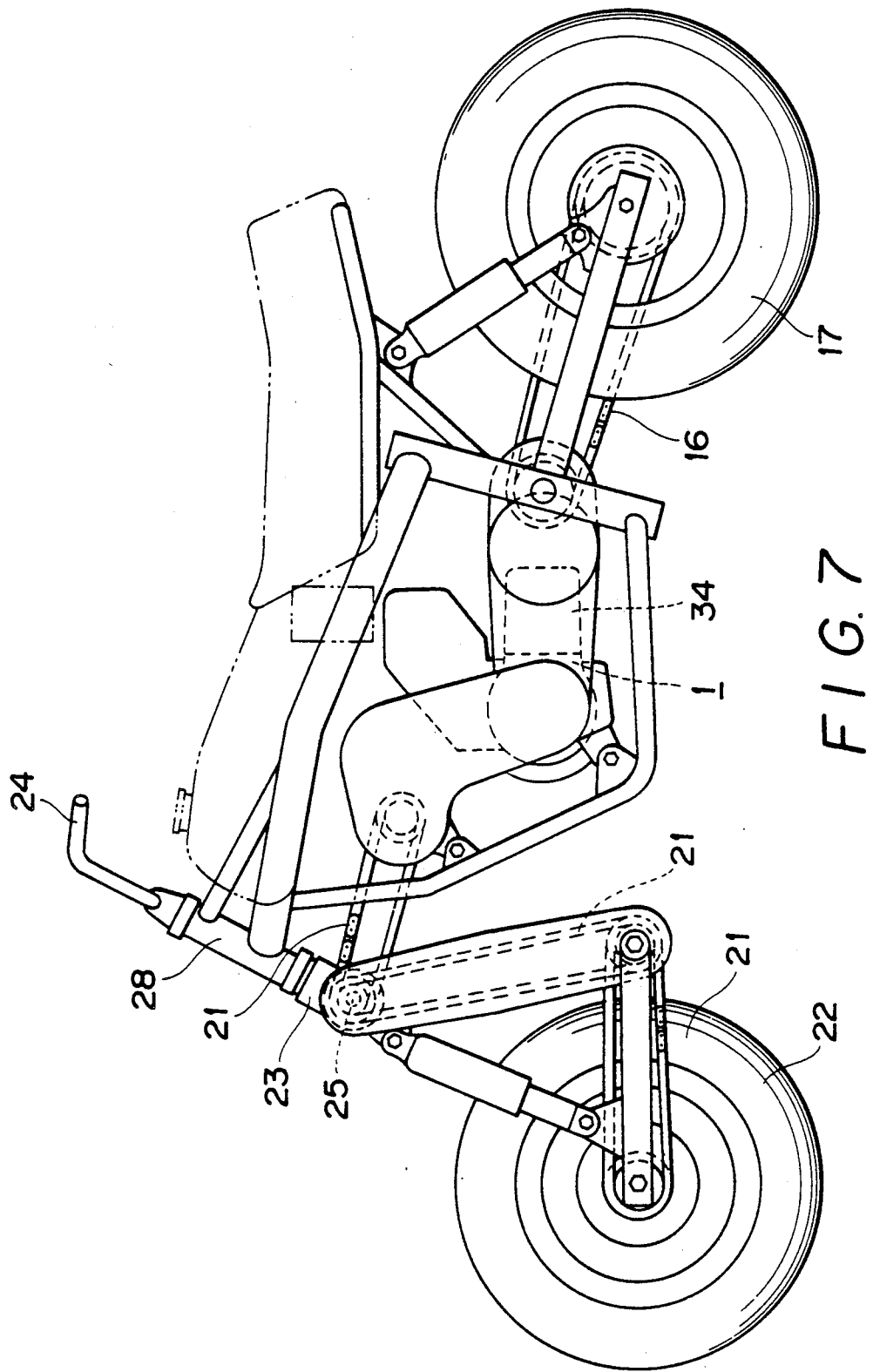
FIGS. 7, 8 and 9 are views corresponding to FIGS. 1, 2 and 3, respectively and representing another embodiment according to the present invention.
Figure 8:
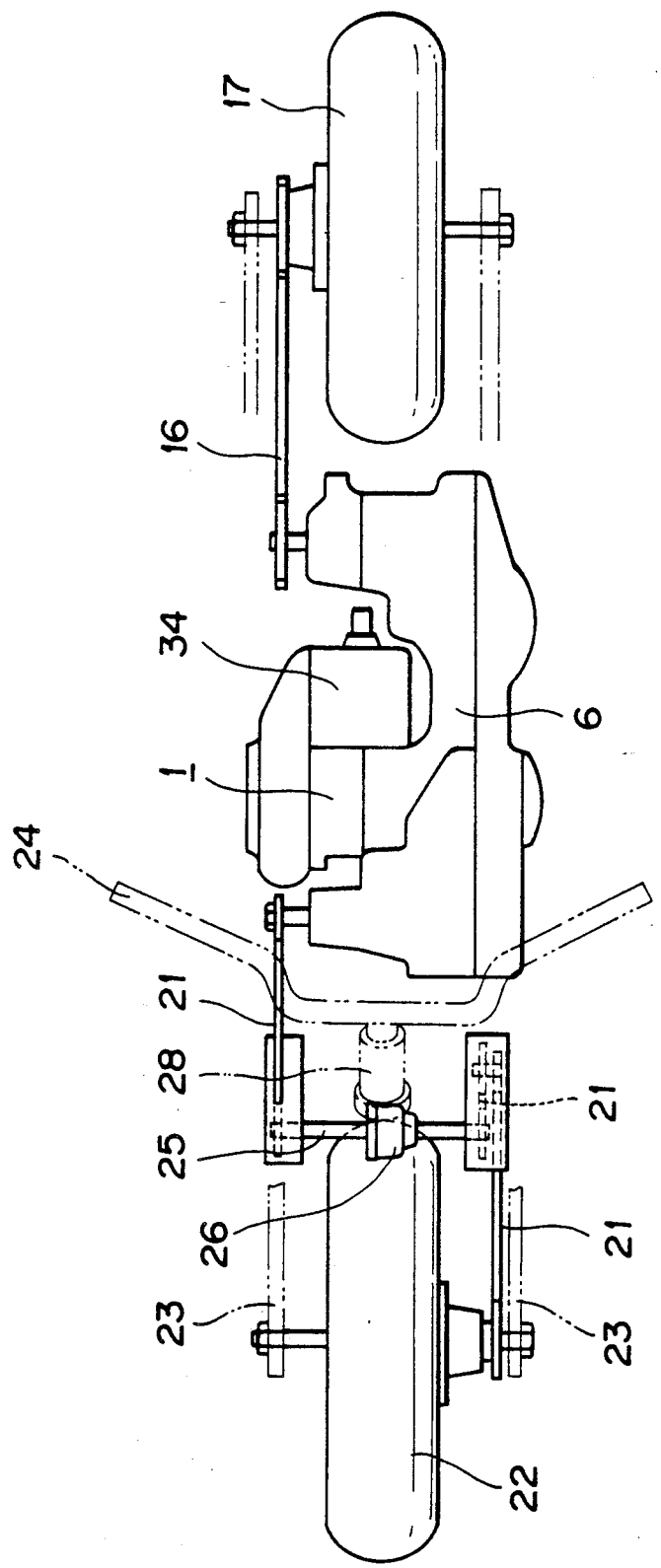
Figure 9:
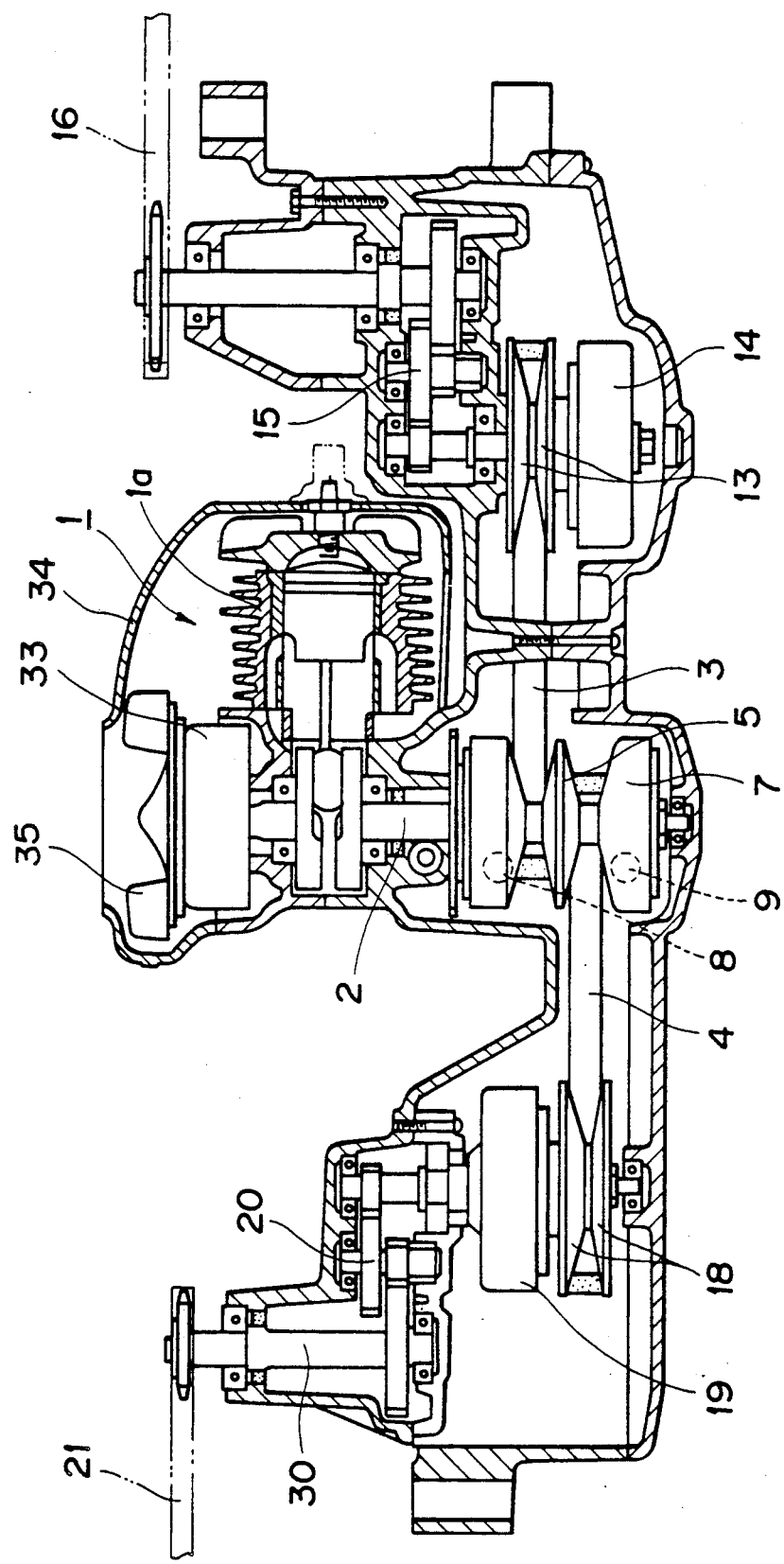

FIGS. 7, 8 and 9 represent another embodiment according to the present invention in which an engine 1 is provided with a cylinder assembly 1a which is directed horizontally rearward and the arrangement of the other constructional elements are substantiallY the same as the arrangement shown in FIGS. 1 to 3 and the details thereof are now omitted.

According to this embodiment, there is provided a front and rear wheel drive motorcycle in which front and rear wheels are driven by an operation of an engine. comprising an engine unit including a cylinder assembly and a crank shaft, the cylinder assembly being directed rearwardly with respect to the rear wheel, first and second speed change belt mechanisms mounted to one end of the crank shaft for driving the front and rear wheels, respectively. The first speed change belt mechanism being operatively connected to first speed change gear mechanism disposed at a front upper portion of the engine unit. The second speed change belt mechanism being disposed on a side of the cylinder assembly and operatively connected to second speed change gear mechanism disposed on a rear side of the cylinder assembly, and a driving pulley means mounted on one end of the crank shaft and operated commonly with respect to the first and second speed change belt mechanisms.

According to the arrangement of this embodiment, the cylinder assembly 1a of the engine 1 is positioned between the location of the crank shaft 2 and the rear side non-stage speed change gear mechanism 15, thus effectively utilizing the space of the motorcycle body.

It is to be understood that the present invention is not limited to the described embodiments and many other changes and modifications may be made without departing from the scopes of the appended claims.

What is claimed is:

1. A front and rear wheel drive motorcycle in which the front and rear wheels are driven by an operation of an engine, comprising:
    an engine unit including a cylinder assembly and a crank shaft;
    first and second speed change belt mechanisms mounted to one end of the crank shaft for driving the front and rear wheels, respectivley, said first and second speed change belt mechanisms being operatively connected to first and second speed change gear mechanisms through first and second driven pulleys respectively provided to the first and second speed change belt mechanisms;
    driving pulley means including a stationary driving pulley mounted to one end of the crank shaft and operated in common with the first and second speed change belt mechanisms, the driving pulley means further including a pair of movable driving pulleys mounted to one end of the crank shaft with the stationary driving pulley interposed therebetween; and
    first and second centrifugal clutch means disposed in operative association with said first and second driven pulleys for differentially driving the front and rear wheels respectivley.

2. A motorcycle according to claim 1; wherein said stationary driving pulley is provided with an inner hollow portion in which a plurality of fans are located, said inner hollow portion being in communication with an axial bore of said crank shaft.

3. A motorcycle according to claim 1; wherein said cylinder assembly is directed with respect to a position of the engine substantially horizontally forward towards the front wheel and the first driven pulley of the first speed change belt mechanism, and the first speed change gear mechanism is disposed at a side with respect to a longitudinal axis of the front wheel and is disposed at an upper side of the cylinder assembly.

4. A motorcycle according to claim 1; wherein said cylinder assembly is directed with respect to a position of the engine substantially horizontally forward towards the front wheel and the first driven pulley of the first belt speed changing mechanism on the side of the front wheel, and the first speed change gear mechanism is disposed at a side with respect to a longitudinal axis of the front wheel and has an output shaft disposed substantially horizontal and in front of the first driven pulley.

5. A motorcycle according to claim 1; wherein said crank shaft has another end; and further comprising a cooling fan magnetically mounted to said other end.

6. A front and rear wheel drive motorcycle in which front and rear wheels are driven by an operation of an engine, comprising:
    an engine unit including a cylinder assembly and a crank shaft, said cylinder assembly being directed with respect to a position of the engine substantially horizontally rearward towards the rear wheel;
    first and second speed change belt mechanisms mounted to one end of the crank shaft for driving the front and rear wheels, respectivley, said first speed change belt mechanism being operatively connected through a first driven pulley to a first speed change mechanism disposed at a front upper portion of the engine unit, said second speed change belt mechanism being disposed at a side of said cylinder assembly and operatively connected through a second driven pulley to a second speed change gear mechanism disposed at a rear side of said cylinder assembly;

a driving pulley means including a stationary driving pulley mounted to one end of the crank shaft and operated in common with the first and second speed change belt mechanisms, the driving pulley means further including a pair of movable driving pulleys mounted to one end of the crank shaft with the stationary driving pulley interposed therebetween; and first and second centrifugal clutch means disposed in operative association with said first and second driven pulleys for differentially driving the front and rear wheels respectively.

7. A motorcycle according to claim 6; wherein said stationary driving pulley is provided with an inner hollow portion in which a plurality of fans are located, said inner hollow portion being in communication with an axial bore of said crank shaft.

8. A motorcycle according to claim 6; wherein said crank shaft has another end; and further comprising a cooling fan magnetically mounted to said other end.

9. A front and rear wheel drive motorcycle, comprising:

an engine including a cylinder assembly and a rotatably driven crank shaft;

driving pulley means mounted on and rotatable with the crank shaft for supplying a rotational driving force to the front and rear wheels, the driving pulley means comprising a first and a second movable pulley mounted on the crank shaft and including means for moving the first and second movable pulleys along a longitudinal axis of the crank shaft dependent on a rotational speed of the crank shaft, and a stationary pulley mounted on the crank shaft and disposed between the first and second movable pulleys;

a first speed change belt mechanism comprising a first drive belt rotatably driven by the combined action of the first movable pulley and the stationary pulley;

a first centrifugal clutch means operatively connected to the front wheel and the first speed change belt mechanism for applying the rotational driving force to the front wheel;

a second speed change belt mechanism comprising a second drive belt rotatably driven by the combined action of the second movable pulley and the stationary pulley; and a second centrifugal clutch means operatively connected to the rear wheel and the second speed change belt mechanism for applying the rotational driving force to the rear wheel.

10. A motorcycle according to claim 9; wherein the stationary pulley has an inner hollow portion in which a plurality of fans are located; and the crank shaft has an axial bore in communication with the inner hollow portion.

11. A motorcycle according to claim 9; wherein the cylinder assembly is positioned and configured with respect to a position of the engine substantially horizontally forward towards the front wheel.

12. A motorcycle according to claim 11; further comprising a first and second speed change gear mechanism operatively connected to the first and second centrifugal clutch means respectively for applying the rotational driving force to the front and rear wheels respectivley, the first speed change gear mechanism being disposed at an upper side of the cylinder assembly.

13. A motorcycle according to claim 12; wherein the first speed change gear mechanism is disposed at a side with respect to a longitudinal axis of the front wheel and comprises an output shaft disposed substantially horizontal and in front of the first centrifugal clutch means.

14. A motorcycle according to claim 9; wherein the cylinder assembly is positioned and configured with respect to a position of the engine substantially horizontally rearward towards the rear wheel.

15. A motorcycle according to claim 9; further comprising a cooling fan magnetically mounted to the crank shaft.

* * * * *